(12) United States Patent
Lambert et al.

(10) Patent No.: US 10,846,256 B2
(45) Date of Patent: Nov. 24, 2020

(54) MULTI-ENDPOINT DEVICE SIDEBAND COMMUNICATION SYSTEM

(71) Applicant: Dell Products L.P., Round Rock, TX (US)

(72) Inventors: Timothy M. Lambert, Austin, TX (US); Yogesh Varma, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/395,584

(22) Filed: Apr. 26, 2019

(65) Prior Publication Data
US 2020/0341929 A1  Oct. 29, 2020

(51) Int. Cl.
*G06F 13/40* (2006.01)
*G06F 13/42* (2006.01)
*G06F 13/38* (2006.01)

(52) U.S. Cl.
CPC ........ *G06F 13/4063* (2013.01); *G06F 13/385* (2013.01); *G06F 13/4221* (2013.01)

(58) Field of Classification Search
CPC combination set(s) only.
See application file for complete search history.

(56) References Cited

U.S. PATENT DOCUMENTS

| | | | |
|---|---|---|---|
| 7,934,032 B1 * | 4/2011 | Sardella | G06F 13/4022 710/104 |
| 8,549,205 B1 * | 10/2013 | Harriman | G06F 13/4027 710/313 |
| 9,842,075 B1 | 12/2017 | Davis et al. | |
| 2008/0288708 A1 * | 11/2008 | Hsueh | G06F 13/385 710/313 |
| 2009/0319909 A1 * | 12/2009 | Hsueh | G06F 9/543 715/740 |
| 2017/0212858 A1 | 7/2017 | Chu et al. | |

* cited by examiner

*Primary Examiner* — Raymond N Phan
(74) *Attorney, Agent, or Firm* — Haynes and Boone, LLP

(57) ABSTRACT

A multi-endpoint device sideband communication system includes a board including a board sideband communication subsystem coupled to a connector on the board. A multi-endpoint adapter device is connected to the board via the connector, and includes an adapter sideband communication subsystem connected to the connector via a first set of adapter sideband connections, and to each of a plurality of endpoint devices included on the multi-endpoint adapter device via respective second sets of adapter sideband communication connections. The adapter sideband communication subsystem receives a first sideband communication from the board sideband communication subsystem via the connector and, based on a first sideband communication policy stored in the adapter sideband communication subsystem, provides the first sideband communication to at least one of the plurality of endpoint devices via each respective second set of adapter sideband communication connections connected to that endpoint device.

17 Claims, 11 Drawing Sheets

MULTI-ENDPOINT DEVICE SIDEBAND COMMUNICATION SYSTEM

BACKGROUND

The present disclosure relates generally to information handling systems, and more particularly to exchanging sideband communications with multiple endpoint devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, may include multiple processors and utilize a Non-Uniform Memory Access (NUMA) computer memory design in which each processor is provided a local memory that it can access quickly, with those processors coupled together via processor interconnects (e.g., Ultra-Path Interconnects (UPIs) available in processing systems provided by INTEL® Corporation of Santa Clara, Calif., United States) that allow the processors to access memory that is local to the other processors. Furthermore, such server devices may be provided with multiple endpoints (e.g., PCI endpoints) coupled to the processors in a manner that allows those processors to access the multiple endpoints. For example, a multi-endpoint adapter device or multiple Non-Volatile Memory express (NVMe) drives may be coupled to a PCIe connector on a motherboard that includes the processors. However, the PCIe Card ElectroMechanical (CEM) specification defines a single set of sideband links per PCIe connector, which is insufficient for many emerging use cases involving the multiple endpoint devices that may be accessible via the PCIe connector.

Accordingly, it would be desirable to provide an improved multi-endpoint device sideband communication system.

SUMMARY

According to one embodiment, an Information Handling System (IHS) includes a first set of adapter sideband connections that are configured to connect to a board sideband communication subsystem; respective second sets of adapter sideband connections that are each configured to connect to a respective endpoint device; an adapter sideband communication processing system coupled to the first set of adapter sideband connections and each respective second set of adapter sideband connections; and an adapter sideband communication memory system that is coupled to the adapter sideband communication processing system and that includes instructions that, when executed by the adapter sideband communication processing system, cause the adapter sideband communication processing system to provide an adapter sideband communication engine that is configured to: receive, via the first set of adapter sideband connections, a first sideband communication from a board sideband communication subsystem; access a first sideband communication policy included in the adapter sideband communication memory system; and provide, based on the first sideband communication policy, the first sideband communication to at least one of a plurality of endpoint devices via the respective second set of adapter sideband communication connections connected to that endpoint device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
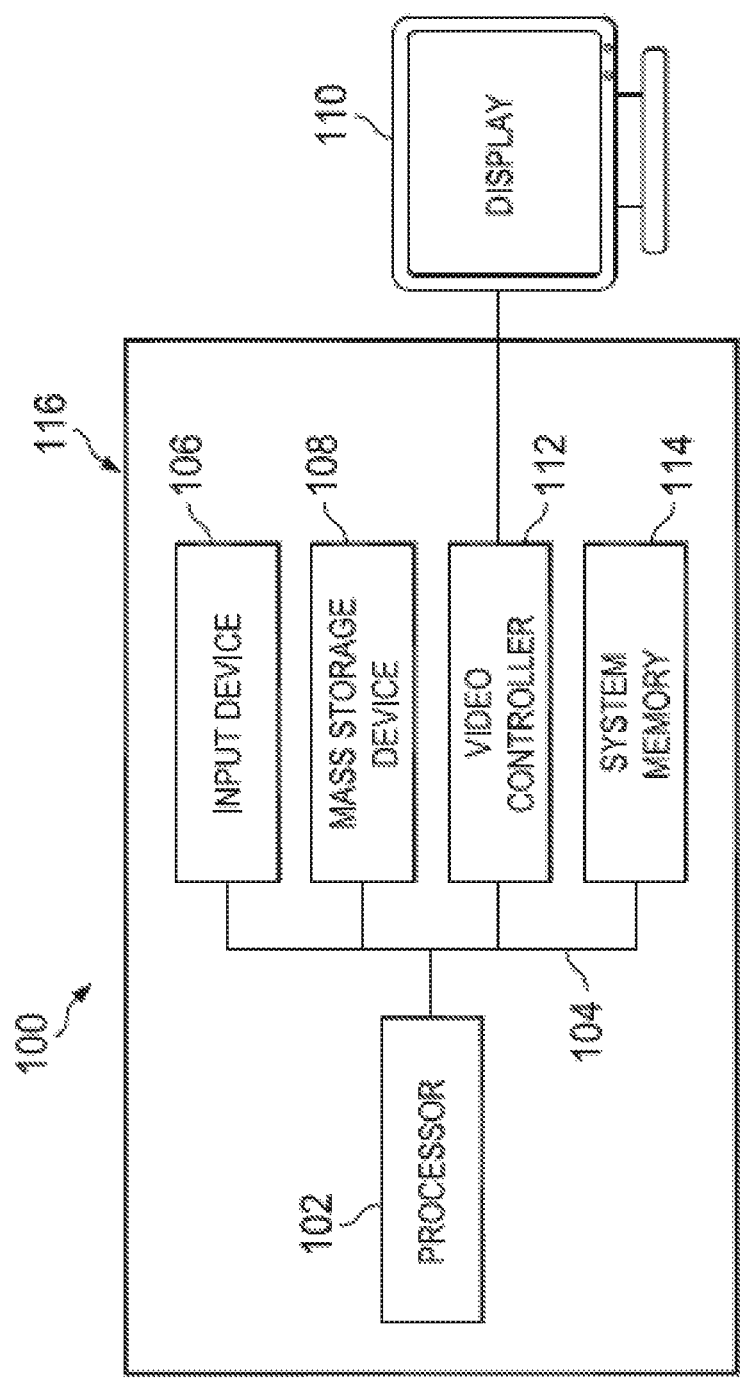
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
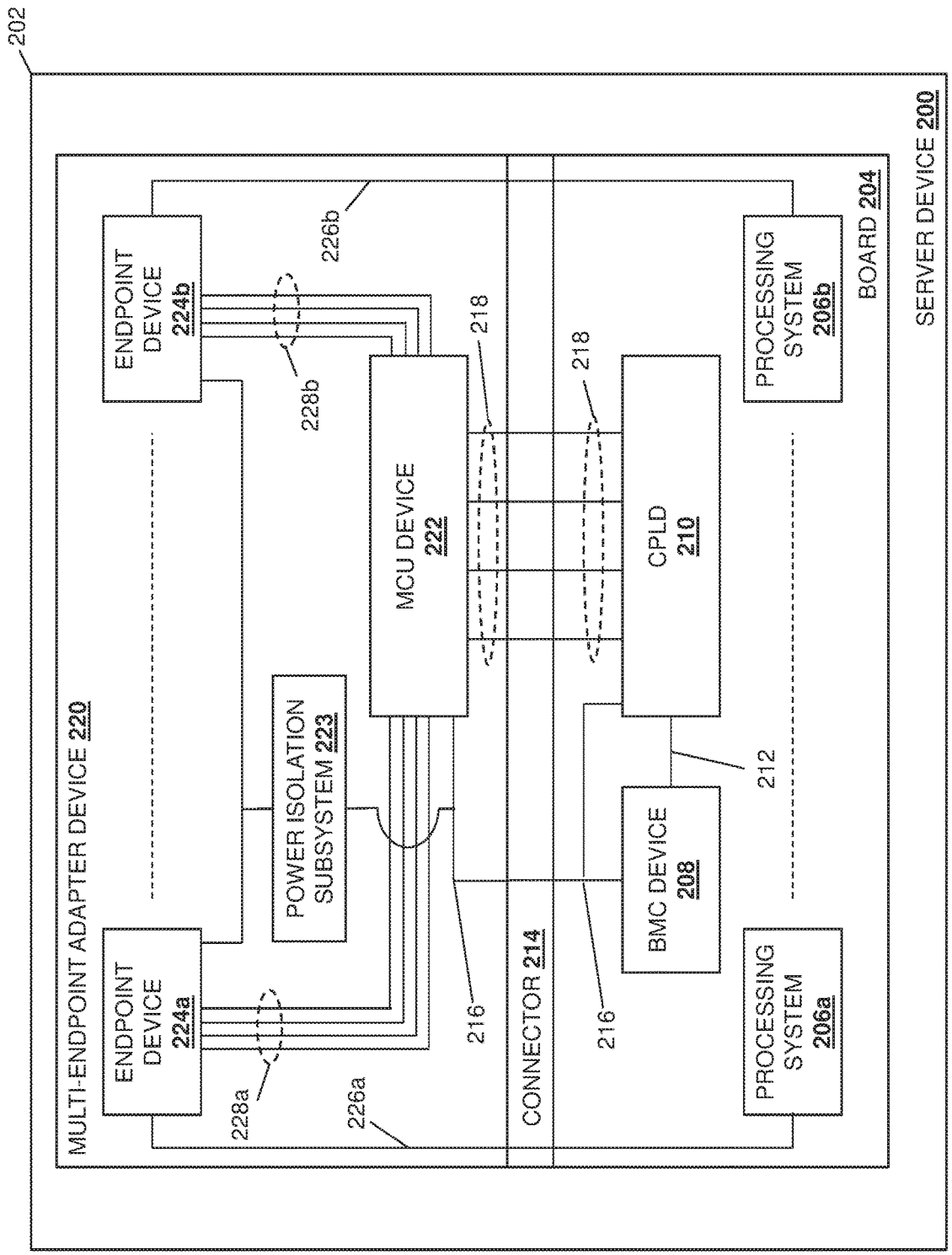
FIG. 2 is a schematic view illustrating an embodiment of a server device that includes an embodiment of the multi-endpoint device sideband communication system of the present disclosure.

Referring now to FIG. 2, an embodiment of a server device 200 is illustrated that may provide the multi-endpoint device sideband communication system of the present disclosure. In an embodiment, the server device 200 may be provided by the IHS 100 discussed above with reference to FIG. 1 and/or may include some or all of the components of the IHS 100. However, while illustrated and discussed as being provided in the server device 200, one of skill in the art in possession of the present disclosure will recognize that the functionality of the server device 200 discussed below may be provided by other devices that are configured to operate similarly as discussed below. In the illustrated embodiment, the server device 200 includes a chassis 202 that houses the components of the server device 200, only some of which are illustrated below. For example, the chassis 202 may house a board 204 that may be provided by a motherboard and/or other circuit boards that would be apparent to one of skill in the art in possession of the present disclosure. The board 204 may include a plurality of processing systems such as the processing systems 206a and up to 206b illustrated in FIG. 2, which one of skill in the art in possession of the present disclosure will recognize may include processor socket(s), Central Processing Units (CPUs), and/or other processing system components known in the art.

While not illustrated, one of skill in the art in possession of the present disclosure will recognize that each of the processing systems 206a-206b may be provided with respective local memory systems. For example, as discussed above, the server device 200 may utilize a Non-Uniform Memory Access (NUMA) computer memory design in which each processing system 206-206b is provided a local memory system that it can access quickly, with those processing systems 206a-206b coupled together via processor interconnects (e.g., Ultra-Path Interconnects (UPIs) available in processing systems provided by INTEL® Corporation of Santa Clara, Calif., United States) that allow the processing systems 206a-206b to access memory systems that are local to the other processing systems 206a-206b. However, while a specific memory design is described, one of skill in the art in possession of the present disclosure will recognize that the server device 200 may utilize a variety of processing system/memory system configurations that will fall within the scope of the present disclosure as well.

As discussed further detail below, the board 204 may include a board sideband communication subsystem that, in the illustrated embodiment, includes a Baseboard Management Controller (BMC) device 208 that may be provided by an integrated DELL® Remote Access Controller (iDRAC) device and/or other remote access controller/BMC devices known in the art. As such, the BMC device 208 may include a BMC processing system (not illustrated, but which may include the processor 102 discussed above with reference to FIG. 1) and a BMC memory system (not illustrated, but which may include the memory 114 discussed above with reference to FIG. 1) that is coupled to the BMC processing system and that includes instructions that, when executed by the BMC processing system, cause the BMC processing system to provide a BMC engine that is configured to perform the functionality of the BMC engines and/or BMC devices discussed below. In addition, one of skill in the art in possession of the present disclosure will recognize that in addition to the functionality discussed below, the BMC device 208 may provide an out-of-band management platform that utilizes BMC resources that are mostly separate from the server device resources (e.g., the resources of the processing systems 206a-206b and their local memory systems), while providing a browser-based-interface or command-line-interface that allows for managing and monitoring the hardware and/or software in the server device 200, as well as a variety of other conventional BMC functionality known in the art.

In the illustrated embodiment, the board sideband communication subsystem included on the board 204 also includes a Complex Programmable Logic Device (CPLD) 210 that, in some embodiments, may perform hardware Inter-Integrated Circuit (I2C) master functionality. As such, the CPLD 210 may include a CPLD processing system (not illustrated, but which may include the processor 102 discussed above with reference to FIG. 1) and a CPLD memory system (not illustrated, but which may include the memory 114 discussed above with reference to FIG. 1) that is coupled to the CPLD processing system and that includes instructions that, when executed by the CPLD processing system, cause the CPLD processing system to provide a CPLD engine that is configured to perform the functionality of the CPLD engines and/or CPLDs discussed below. Furthermore, one of skill in the art in possession of the present disclosure will recognize that in addition to the functionality described below, the CPLD 210 may manage configurations, resets, wake operations, throttling, and/or other endpoint-related CPLD operations (e.g., for the endpoint devices discussed below), as well as perform a variety of conventional CPLD functionality known in the art. In the illustrated embodiment, the BMC device 208 and the CPLD 210 are coupled together via a memory mapped interface 212, although other BMC/CPLD interfaces will fall within the scope of the present disclosure as well.

In the illustrated embodiment, the board 204 includes a connector 214 that, in the embodiments discussed below, may be provided by a PCIe connector/slot, a riser device including a PCIe connector/slot, and/or a variety of other connectors that would be apparent to one of skill in the art in possession of the present disclosure. Furthermore, while discussed as a PCIe connector that couples to PCI adapter cards/devices, one of skill in the art in possession of the present disclosure will recognize that the board may be connected to the endpoint devices of the present disclosure using a variety of interconnect technologies that will fall within the scope of the present disclosure as well. In the illustrated embodiment, each of the BMC device 208 and the CPLD 210 are coupled to the connector 214 via a sideband interface 216 that may be provided by an Inter-Integrated Circuit (I$^2$C) sideband bus and/or other sideband communication interfaces known in the art. As will be appreciated by one of skill in the art in possession of the present disclosure, BMC devices such as the iDRAC device discussed above have conventionally utilized I$^2$C sideband buses to manage PCIe endpoint devices (e.g., via the Management Component Transport Protocol (MTCP) over the System Management BUS (SMBUS)), but such I$^2$C sideband buses have not conventionally been connected to CPLDs, and that connection may be provided in order to enable at least some of the functionality discussed below. However, one of skill in the art in possession of the present disclosure will also recognize that the functionality provided by the CPLD 210 via the sideband interface 216 discussed below may be provided by a variety of other subsystem and/or in a variety of other manners that will fall within the scope of the present disclosure as well. In the illustrated embodiment, the CPLD 210 is also coupled to the connector 214 via an adapter sideband connection set 218 of adapter sideband connections that, in the examples discussed below are provided by a present signal connection (e.g., PRSNT_N), a wake signal connection (e.g., WAKE_N), a reset signal connection (e.g., PERST_N), and a throttling signal connection (e.g., PWRBRAKE_N), although other adapter sideband connections will fall within the scope of the present disclosure as well.

In the illustrated embodiment, a multi-endpoint adapter device 220 is connected to the connector 214. For example, the multi-endpoint adapter device 220 may be provided by a PCIe device (e.g., a PCIe adapter card) that includes a card edge that is configured to engage a PCI card connector/slot provided by the connector 214. However, as discussed above, other devices may provide the multi-endpoint adapter device 220 while remaining within the scope of the present disclosure as well. As discussed further detail below, the multi-endpoint adapter device 220 may include an adapter sideband communication subsystem that, in the illustrated embodiment, is provided by a Micro-Controller Unit (MCU) device 222, but which may be provided by a Application Specific Integrated Circuit (ASIC), a Programmable Logic Device (PLD), and/or any other device that one of skill in the art in possession of the present disclosure would recognize as capable of providing for the functionality (e.g., the per-endpoint sideband Input/Output (I/O) communication functionality and/or other functionality) discussed below. Furthermore, as discussed below, the MCU device 222 may be configured to provide hardware/low-level tunneling without the involvement of firmware, a Basic Input/Output System (BIOS), or an operating system that are provided in the server device 200. As such, the MCU device 222 may include a MCU processing system (not illustrated, but which may include the processor 102 discussed above with reference to FIG. 1) and a MCU memory system (not illustrated, but which may include the memory 114 discussed above with reference to FIG. 1) that is coupled to the MCU processing system and that includes instructions that, when executed by the MCU processing system, cause the MCU processing system to provide an MCU engine that is configured to perform the functionality of the MCU engines and/or MCU devices discussed below.

As can be seen, the connector 214 and the multi-endpoint adapter device 220 extend the sideband interface 216 to the MCU device 222 to couple the MCU device 222 to each of the BMC device 208 and the CPLD 210 on the board 204 via that sideband interface 216. Furthermore, the connector 214 and the multi-endpoint adapter device 220 also extend the adapter sideband connection set 218 to the MCU device 222 to couple the MCU device 222 to the CPLD 210 on the board 204 via that adapter sideband connection set 218 and the connector 214. Further still, in the illustrated embodiment, the sideband interface 216 is also coupled to each of the endpoint devices 224a-224b via a power isolation subsystem 223, the functionality of which is discussed in further detail below.

The multi-endpoint adapter device 220 includes a plurality of endpoint devices such as the the endpoint devices 224a and up to 224b illustrated in FIG. 2. As can be seen, each of the endpoint devices 224a-224b may be connected to the respective processing systems 206a-206b on the board 204 via separate bus connections 226a and 226b, respectively, provided through the connector 214. For example, the endpoint devices 224a-224b may each be provided by a separate PCIe hardware device that is coupled to its respective processing system via a separate PCIe bus (e.g., a x16 PCIe bus), although other processing system/endpoint device connection configurations will fall within the scope of the present disclosure as well. Furthermore, as illustrated, for each endpoint device 224a-224b, the MCU device 222 includes respective adapter sideband connection sets 228a-228b including multiple adapter sideband connections. As such, continuing with the example provided below, the adapter sideband connection set 228a may be provided by a present signal connection (e.g., a PRSNT_N connection), a wake signal connection (e.g., a WAKE_N connection), a reset signal connection (e.g., a PERST_N connection), and a throttling signal connection (e.g., a PWRBRAKE_N connection), although other adapter sideband connections will fall within the scope of the present disclosure as well. Similarly, the adapter sideband connection set 228b may be provided by a present signal connection (e.g., a PRSNT_N connection), a wake signal connection (e.g., a WAKE_N connection), a reset signal connection (e.g., a PERST_N connection), and a throttling signal connection (e.g., a PWRBRAKE_N connection), although other adapter sideband connections will fall within the scope of the present disclosure as well. However, while a specific server device 200 has been illustrated and described, one of skill in the art in possession of the present disclosure will recognize that server devices may include a variety of components and/or component configurations for providing conventional server device functionality, as well as the functionality described below, while remaining within the scope of the present disclosure as well.

Figure 3:
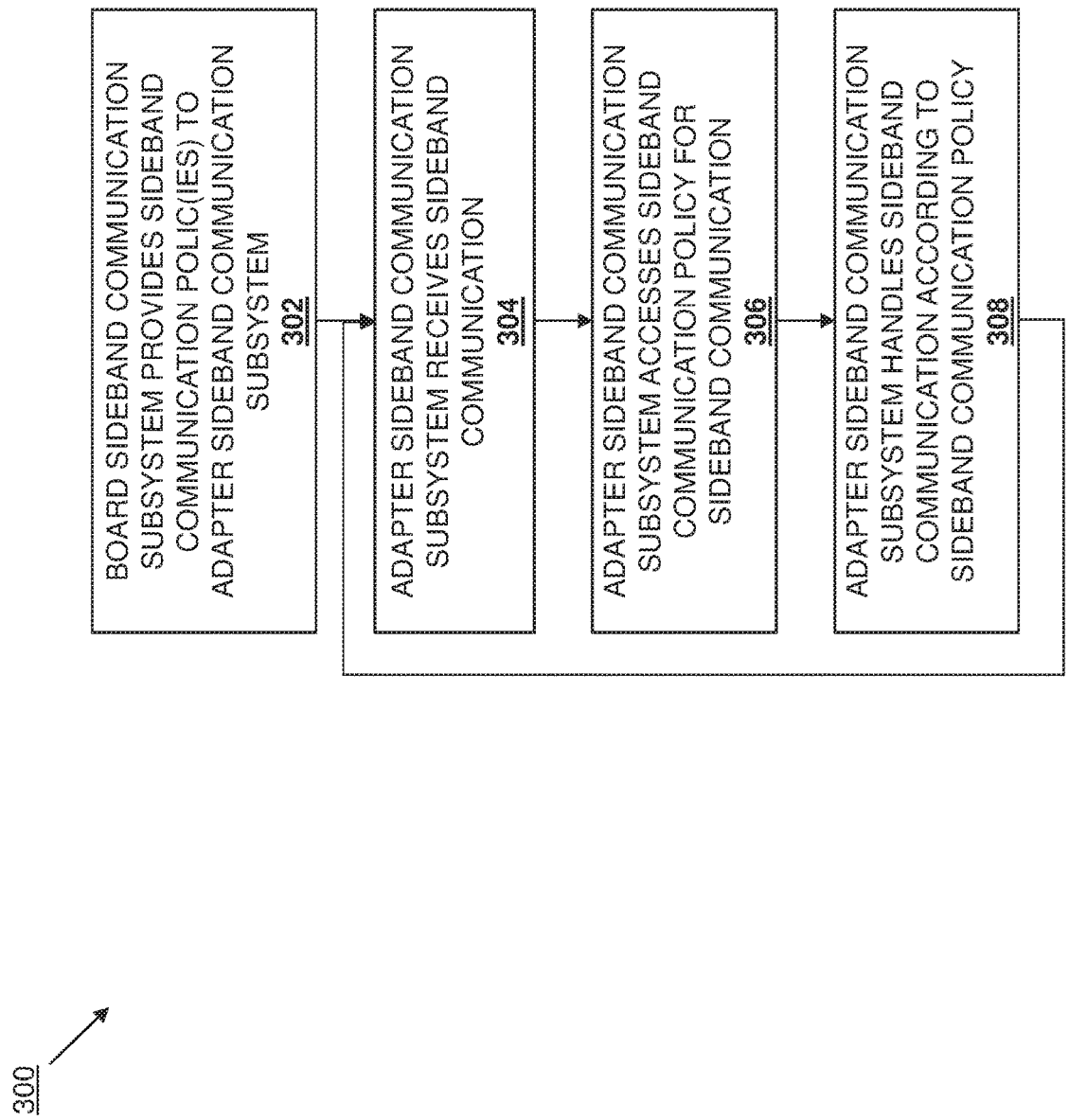
FIG. 3 is a flow chart illustrating an embodiment of a method for providing sideband communications with multiple endpoint devices.

Referring now to FIG. 3, an embodiment of a method for providing sideband communications with multiple endpoints is illustrated. As discussed above, conventional connectors such as those described in the PCIe Card Electro-Mechanical (CEM) specification are provided with a single set of sideband connections/links per PCIe connector, which is insufficient for many emerging use cases involving the multiple endpoint devices that may be accessible via that PCIe connector. To address this issue, the systems and methods of the present disclosure provide for sideband communications to multiple endpoints by providing respective sets of sideband connections/links between an adapter sideband communication subsystem on a multi-endpoint adapter device and each of a plurality of endpoint devices on that multi-endpoint adapter device. Upon boot of a server device, a board sideband communication subsystem on a board in the server device may provide sideband communication policies to the adapter sideband communication subsystem on the multi-endpoint adapter device that is connected to the board via the connector. The board sideband communication subsystem may then subsequently provide sideband communications via the single set of sideband links available to the adapter sideband communication subsystem via the connector, and upon receiving any sideband communication, the adapter sideband communication system may retrieve the sideband communication policy for that sideband communication and handle that sideband communication according to the sideband communication policy. The handling of the sideband communication may include transmitting that sideband communication over any of the respective sets of sideband links to any of the endpoint devices connected thereto. As such, endpoint device sideband communication use cases such as 1-to-1 side band communications, 1-to-many sideband communications, 1-to-all sideband communications are enabled with multiple endpoint devices, as well a variety of other sideband communication use cases discussed below for the multiple endpoint devices provided on the multi-endpoint adapter device.

The method 300 begins at block 302 where a board sideband communication subsystem provides one or more sideband communication policies to an adapter sideband communication subsystem. In an embodiment, at block 302, the board sideband communication subsystem included on the board 204 may utilize a sideband interface to the adapter sideband communication subsystem included on the multi-endpoint adapter device 220 in order to provide one or more sideband communication policies on the adapter sideband communication subsystem. For example, at or before block 302 the multi-endpoint adapter device 220 may be connected to the board 204 via the connector 214, and the server device 200 may be powered on, reset, rebooted, and/or otherwise initialized. As would be understood by one of skill in the art in possession of the present disclosure, during initialization of the server device 200, the BMC device 208 may operate in an auxiliary power domain while the endpoint devices 224a-224b remain unpowered, and the power isolation subsystem 223 may prevent auxiliary power domain BMC device operations via the sideband interface 216 from reaching the endpoint devices 224a-224b in a manner that may cause problems with their subsequent operation. Furthermore, following the powering of the endpoint devices 224a-224b, the power isolation subsystem 223 may allow BMC device operations via the sideband interface 216 with the endpoint devices 224a-224b in order to perform a variety of endpoint device management functions that would be apparent to one of skill in the art in possession of the present disclosure.

During the initialization of the server device 200, the BMC engine in the BMC device 208 may operate to determine the sideband communication capabilities of the multi-endpoint adapter device 220 via the sideband interface 216. For example, the BMC device 208 may read per-slot Virtual Product Data (VPD) from the multi-endpoint adapter device 220 in order to identify the number of endpoint devices included on the multi-endpoint adapter device 220 (e.g., an active endpoint device count), sideband I/O support information provided on the multi-endpoint adapter device 220 in order to determine sideband I/O support capabilities (e.g., out-of-band discrete I/O tunneling capabilities) available in the multi-endpoint adapter device 220/MCU device 222, and/or any other information about the multi-endpoint adapter device 220 that would be apparent to one of skill in the art in possession of the present disclosure. Furthermore, the BMC engine in the BMC device 208 may have access to the sideband communication capabilities of the board 204/server device 200, and using the sideband communication capabilities of the multi-endpoint adapter device 220 and/or the board 204/server device 200, the BMC engine in the BMC device 208 may determine, retrieve, and/or otherwise identify one or more sideband communication policies that, as discussed below, define how the adapter sideband communication system on the multi-endpoint adapter device 220 and/or the board adapter sideband communication system (e.g., the CPLD 210 in the illustrated example) on the board 204 will handle sideband communications transmitted to and from the endpoint devices 224a-224b.

In some embodiments of block 302, the BMC engine in the BMC device 208 may provide the one or more sideband communication policies on the MCU device 222 via the sideband interface 216. Furthermore, in some embodiments, the BMC engine in the BMC device 208 may provide the one or more sideband communication policies to the CPLD 210, and the CPLD engine in the CPLD 210 may provide the one or more sideband communication policies on the MCU device 222 via the sideband interface 216. In specific examples, providing the one or more sideband communication policies on the MCU device 222 may include programming registers in the MCU device 222 (e.g., control registers, status registers, etc.) and/or any other policy provisioning techniques that would be apparent to one of skill in the art in possession of the present disclosure. Furthermore, at block 302, the BMC engine in the BMC device 208 may also program (e.g., provide instruction code) in a CPLD memory system in the CPLD 210 in order to program the CPLD 210 to handle sideband communications transmitted to and from the endpoint devices 224a-224b in the manners described below.

As discussed in further detail below, some examples of sideband communication policies provided to the adapter sideband communication subsystem/MCU device 222 at block 502 may include a 1-to-1 sideband communication policy that provides for the transmission of any particular sideband communication to a particular one of the endpoint devices 224a-224b, a 1-to-all sideband communication policy that provides for the transmission of any particular sideband communication to all of the endpoint devices 224a-224b, and a 1-to-many sideband communication policy that provide for the transmission of any particular sideband communication more than two but less than all of the plurality of endpoint devices 224a-224b. As such, sideband communication policies may exclude (e.g., mask) any or all of the endpoint devices 224a-224b from sending particular sideband communications to the board 204 and/or receiving any particular sideband communication from the board 204. Other examples of sideband communication policies provided to the adapter sideband communication subsystem/MCU device 222 at block 502 may include a blocking sideband communication policy that blocks any particular sideband communication from one or more of the endpoint devices 224a-224b from being sent to the board 204.

Yet other examples of sideband communication policies provided to the adapter sideband communication subsystem/MCU device 222 at block 502 may include logging any particular sideband communication sent to or from the endpoint devices 224a-224b based on endpoint device presence and/or wake status, ignoring any particular sideband communication sent to or from the endpoint devices 224a-224b based on endpoint device presence and/or wake status, and/or providing different sideband communication behaviors for any particular sideband communication sent to or from the endpoint devices 224a-224b based on endpoint device presence and/or wake status. Furthermore, other examples of sideband communication policies provided to the adapter sideband communication subsystem/MCU device 222 at block 502 may include pulsing a reset signal sideband communication to an endpoint device to perform link recovery, holding a reset signal sideband communication to an endpoint device to disable that endpoint device, and/or similar sideband communication operations that would be apparent to one of skill in the art in possession of the present disclosure. In a specific example discussed in more detail below, a sideband communication may provide for sequential per-endpoint resets by having the adapter sideband communication subsystem/MCU device 222 provide a reset signal to first endpoint device in response to receiving that reset signal from the board signal communication subsystem via the adapter sideband connection set 218, and then subsequently provide sequential reset signals to other endpoint devices in response to receiving those reset signals sequentially from the board signal communication subsystem via the sideband interface 216. However, while several specific sideband communication policies have been described, one of skill in the art in possession of the present disclosure will recognize that virtually any sideband communication policy supported by the server device 200/board 204 and the multi-endpoint adapter device 220/MCU device 222 may be provided to the adapter sideband communication subsystem at block 302 while remaining within the scope of the present disclosure as well.

The method 300 then proceeds to block 304 where the adapter sideband communication subsystem receives a sideband communication. In some embodiments, at block 304, the BMC device 208 may configure the CPLD 210 to instantiate and tunnel any desired sideband communication in real-time and, in response, the CPLD engine in the CPLD 210 may transmit sideband communication(s) over the adapter sideband connection set 218 and through the connector 214 to the MCU device 222. As will be recognized by one of skill in the art in possession of the present disclosure, the BMC device 208 may receive a request from one of the processing systems 206a-206b to, for example, reset one of more of the endpoint devices 224a-224b, throttle one or more of the endpoint devices 224a-224b, and/or a variety of other sideband communication scenarios known in the art, and may cause the CPLD engine in the CPLD 210 to generate and transmit a corresponding sideband communication to the MCU device 222. As such, with reference to the specific examples discussed above, the sideband communication sent by the CPLD engine in the CPLD 210 at block 304 may include a reset signal (e.g., a PERST_N signal) sent via the reset signal connection (e.g., a PERST_N connection) included in the adapter sideband connection set 218, or a throttling signal (e.g., a PWRBRAKE_N signal) sent via the throttling signal connection (e.g., a PWRBRAKE_N connection) included in the adapter sideband connection set 218. With reference to the specific example illustrated in FIG. 4A, the CPLD 210 is illustrated as transmitting a reset signal 400 via a reset signal connection included in the adapter sideband connection set 218. With reference to the specific example illustrated in FIG. 5A, the CPLD 210 is illustrated as transmitting a throttling signal 500 via a throttling signal connection included in the adapter sideband connection set 218.

As will be appreciated by one of skill in the art in possession of the present disclosure, I²C/sideband interface 216 detection of bus idle conditions, bus busy conditions, collision conditions, and back-off conditions may be supported by the CPLD 210, the BMC device 208, and the MCU device 222 via the MCTP, which allows all devices acting as masters and slaves to interact in a reliable and timely manner. Furthermore, one of skill in the art in possession of the present disclosure will appreciate that sideband and/or I/O communication on the adapter sideband connection set 218 can tolerate the latency of a sideband communication collision, and may retry higher priority sideband communications such as the reset signals or throttling signals discussed above.

In other embodiments, at block 304, one of the endpoint devices 224a-224b may generate and transmit a sideband communication over its respective adapter sideband connection set 228a-228b to the MCU device 222. As will be recognized by one of skill in the art in possession of the present disclosure, an endpoint device may generate a sideband communication in order to identify its presence, in response to performing a wake operation, and/or in response to any of a variety of other sideband communication scenarios known in the art. As such, continuing with the examples provided above, the sideband communication sent by an endpoint device at block 304 may include a present signal (e.g., a PRSNT_N signal) sent by that endpoint device via the present signal connection (e.g., a PRSNT_N connection) included in its corresponding adapter sideband connection set 228a-228b, or a wake signal (e.g., a WAKE_N signal) sent by that endpoint device via the wake signal connection (e.g., a WAKE_N connection) included in its corresponding adapter sideband connection set 228a-228b. With reference to the specific example illustrated in FIG. 6A, the endpoint device 224a is illustrated as transmitting a wake signal 600 via a wake signal connection included in the adapter sideband connection set 228a. However, while several examples of the transmission and receipt of sideband communications by the adapter sideband communication subsystem/MCU device 222 have been described, one of skill in the art in possession of the present disclosure will recognize that sideband communications may be received by the adapter sideband communication subsystem/MCU device 222 in any of a variety of manners that will fall within the scope of the present disclosure as well.

Figure 4A:
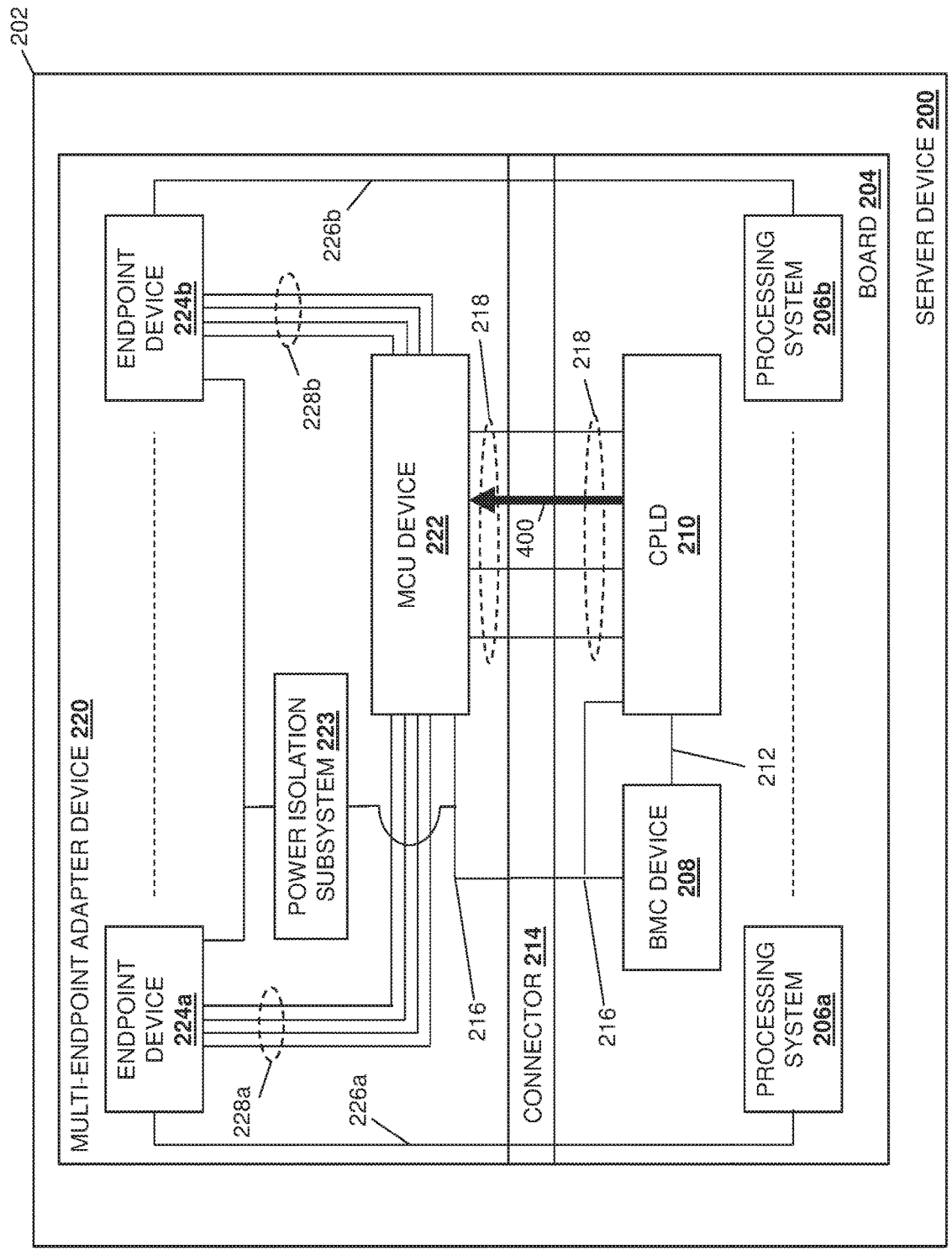
FIG. 4A is a schematic view illustrating an embodiment of the operation of the multi-endpoint device sideband communication system in the server device of FIG. 2 during the method of FIG. 3.
Figure 5A:
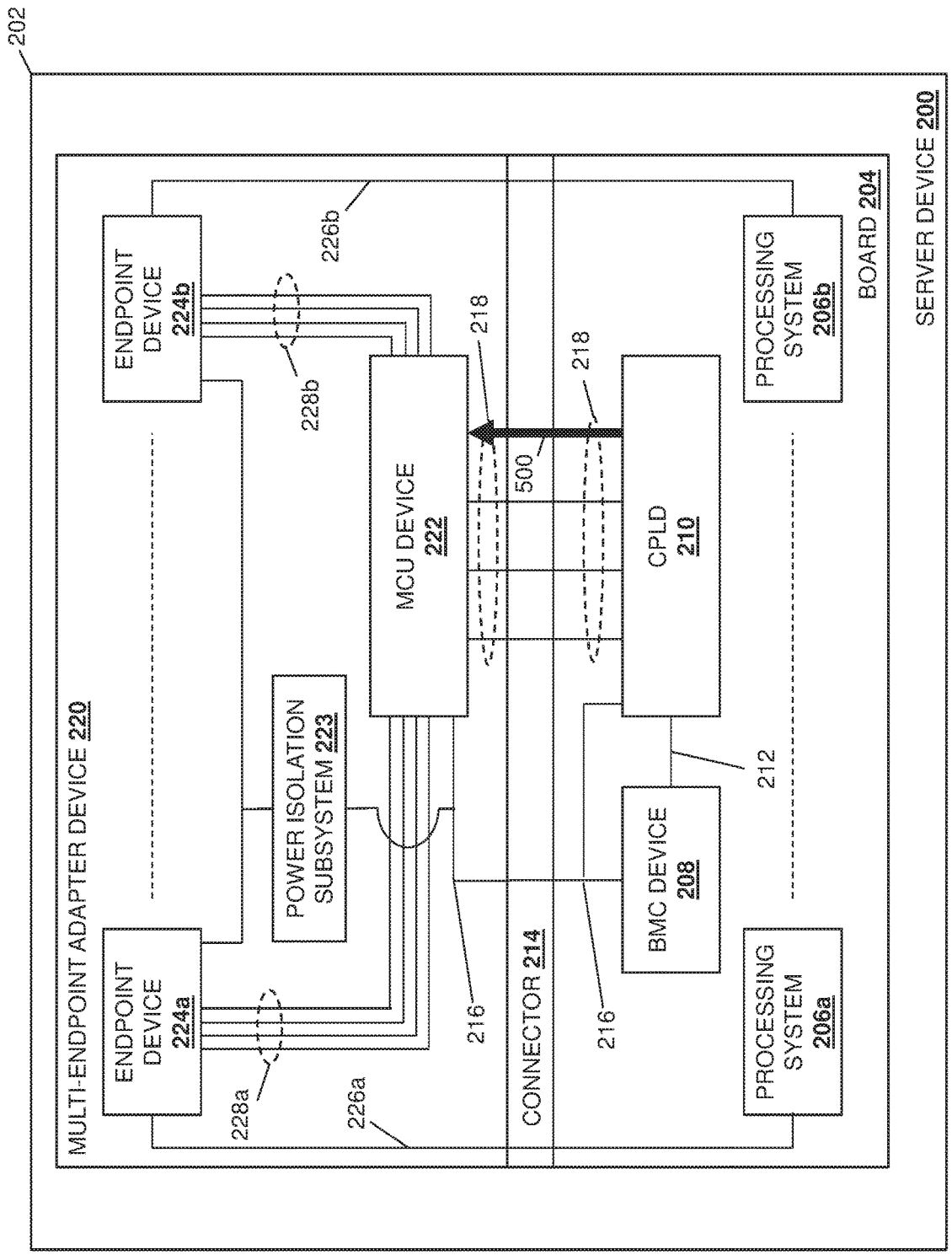
FIG. 5A is a schematic view illustrating an embodiment of the operation of the multi-endpoint device sideband communication system in the server device of FIG. 2 during the method of FIG. 3.
Figure 6A:
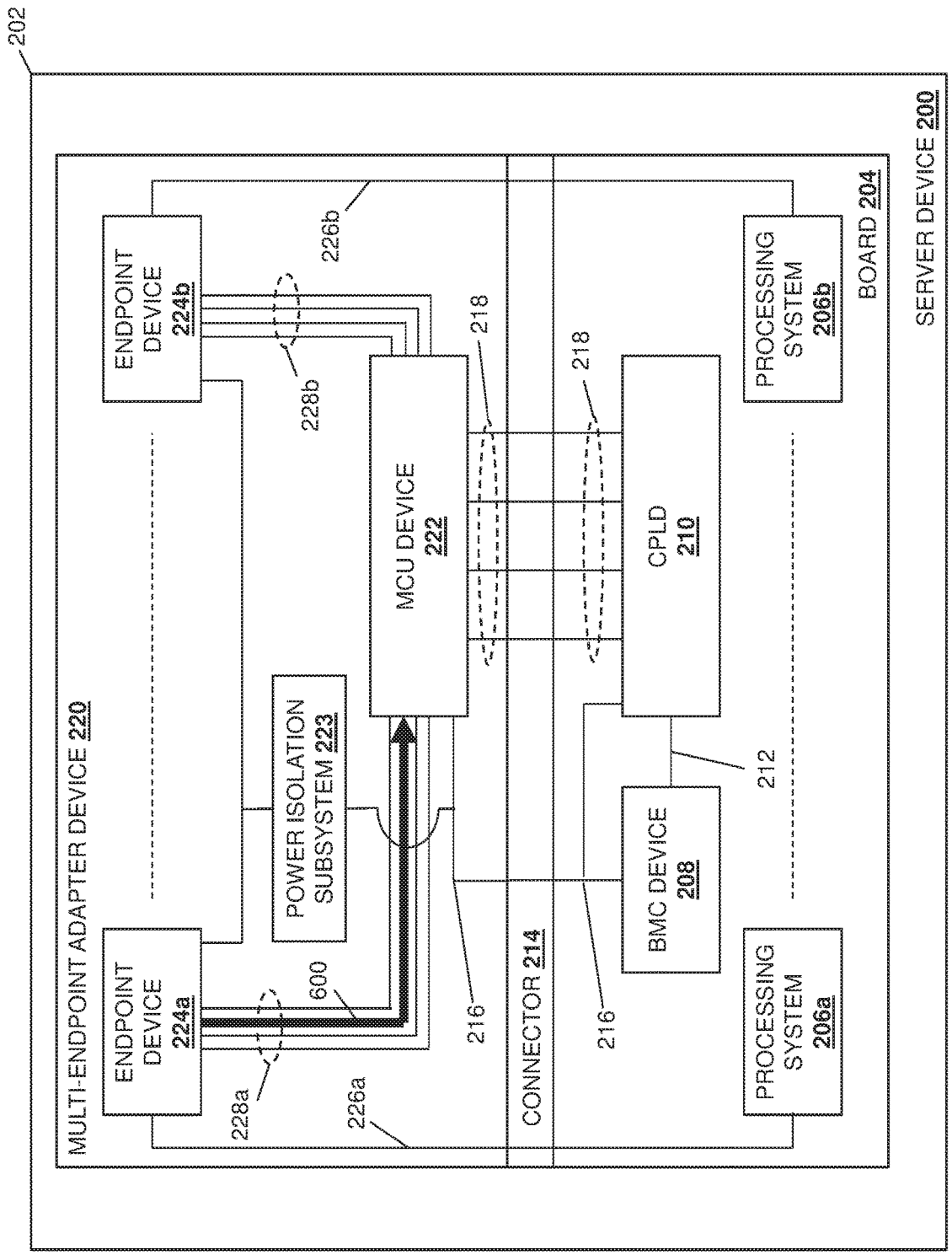
FIG. 6A is a schematic view illustrating an embodiment of the operation of the multi-endpoint device sideband communication system in the server device of FIG. 2 during the method of FIG. 3.

The method 300 then proceeds to block 306 where the adapter sideband communication subsystem accesses a sideband communication policy for the sideband communication received at block 304. In an embodiment, at block 306, the MCU engine in the MCU device 222 may operate to identify the sideband communication received at block 304 (e.g., a reset signal, a throttling signal, a presence signal, a wake signal, etc.) and, in response, identify a sideband communication policy that was provided by the board sideband communication system (e.g., in registers in the MCU device 222) at block 302. As discussed above, at block 302 the MCU device 222 may have been provided sideband communication polic(ies) that are associated with a variety of different sideband communication signals that may be received by the MCU device 222, and thus the MCU engine in the MCU device 222 may use the identity of the sideband communication that was received at block 304 to retrieve a sideband communication policy that is associated with that sideband communication. As such, with reference to the reset signal 400 received as illustrated in FIG. 4A, the MCU engine in the MCU device 222 may retrieve a reset signal sideband communication policy that was received at block 302 and associated with that reset signal 400. Furthermore, with reference to the throttling signal 500 received as illustrated in FIG. 5A, the MCU engine in the MCU device 222 may retrieve a throttling signal sideband communication policy that was received at block 302 and associated with that throttling signal 500. Further still, with reference to the wake signal 600 received as illustrated in FIG. 6A, the MCU engine in the MCU device 222 may retrieve a wake signal sideband communication policy that was received at block 302 and associated with that wake signal 600 and/or the endpoint device 224a that transmitted that wake signal 600. However, while specific examples of sideband communication policy retrievals have been described, one of skill in the art in possession of the present disclosure will recognize that virtually any sideband communication policy may be retrieved for any sideband communication received while remaining within the scope of the present disclosure.

Figure 4B:
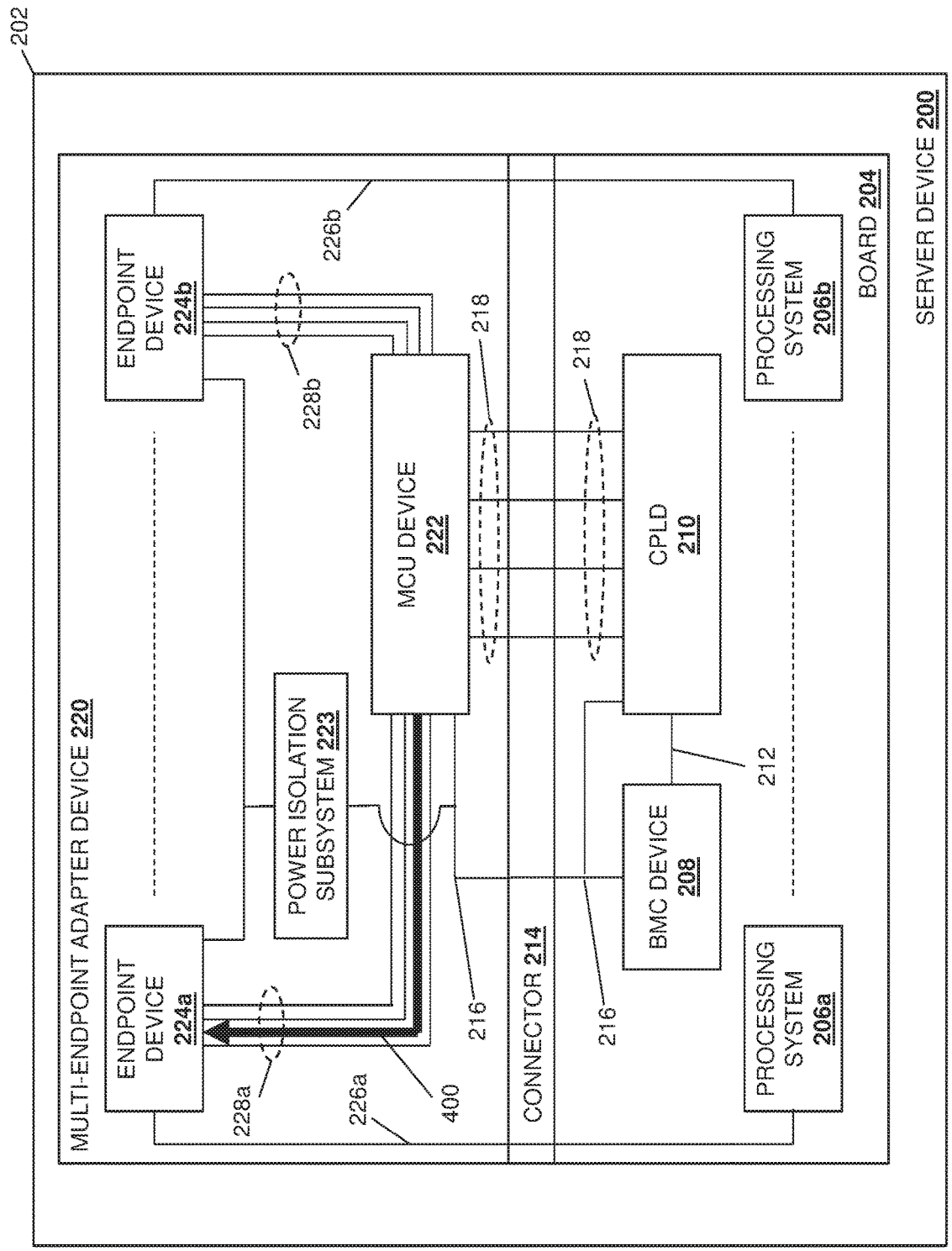
FIG. 4B is a schematic view illustrating an embodiment of the operation of the multi-endpoint device sideband communication system in the server device of FIG. 2 during the method of FIG. 3.

The method 300 then proceeds to block 308 where the adapter sideband communication subsystem handles the sideband communication according to the sideband communication policy. In an embodiment, at block 308, the MCU engine in the MCU device 222 may perform a variety of actions that are dictated by the sideband communication policy retrieved at block 306. With reference to FIGS. 4A and 4B, in response to receiving the reset signal 400 the MCU engine in the MCU device 222 may have retrieved a reset signal sideband communication policy that provides for the transmittal of that reset signal 400 to only a single endpoint device. As such, the example in FIG. 4B illustrates the MCU engine in the MCU device 222 transmitting the reset signal 400 over the reset signal connection in the adapter sideband connection set 228a to the endpoint device 224a, which may be identified in the reset signal sideband communication policy. In some examples, the reset signal sideband communication policy may identify to the MCU device 222 and/or the CPLD 210 that any discrete CPLD-to-MCU reset signal input will be transmitted to a single designated endpoint device. As such, 1-to-1 sideband communications may be enabled by sideband communication policies programmed in the MCU device 222.

Figure 4C:
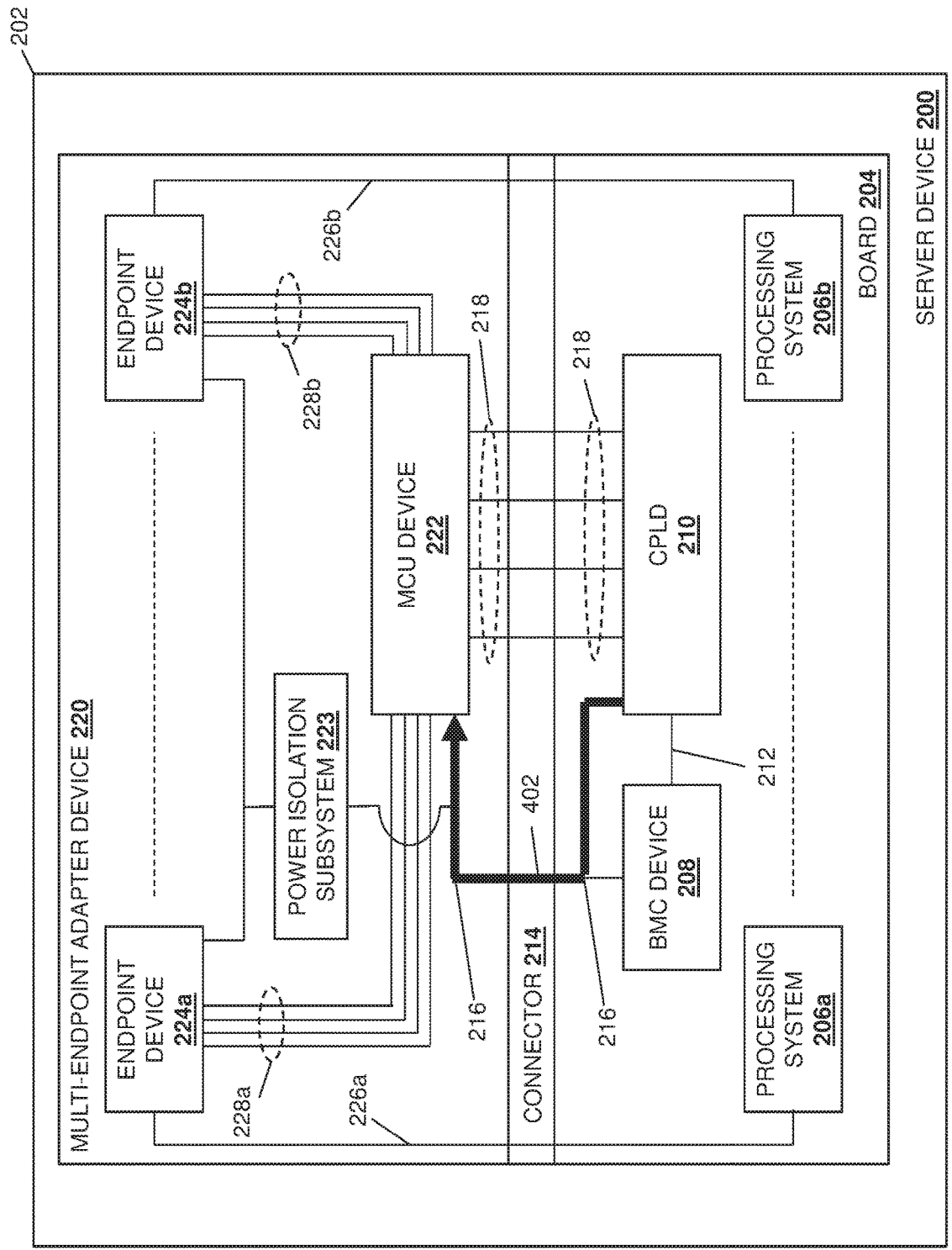
FIG. 4C is a schematic view illustrating an embodiment of the operation of the multi-endpoint device sideband communication system in the server device of FIG. 2 during the method of FIG. 3.
Figure 4D:
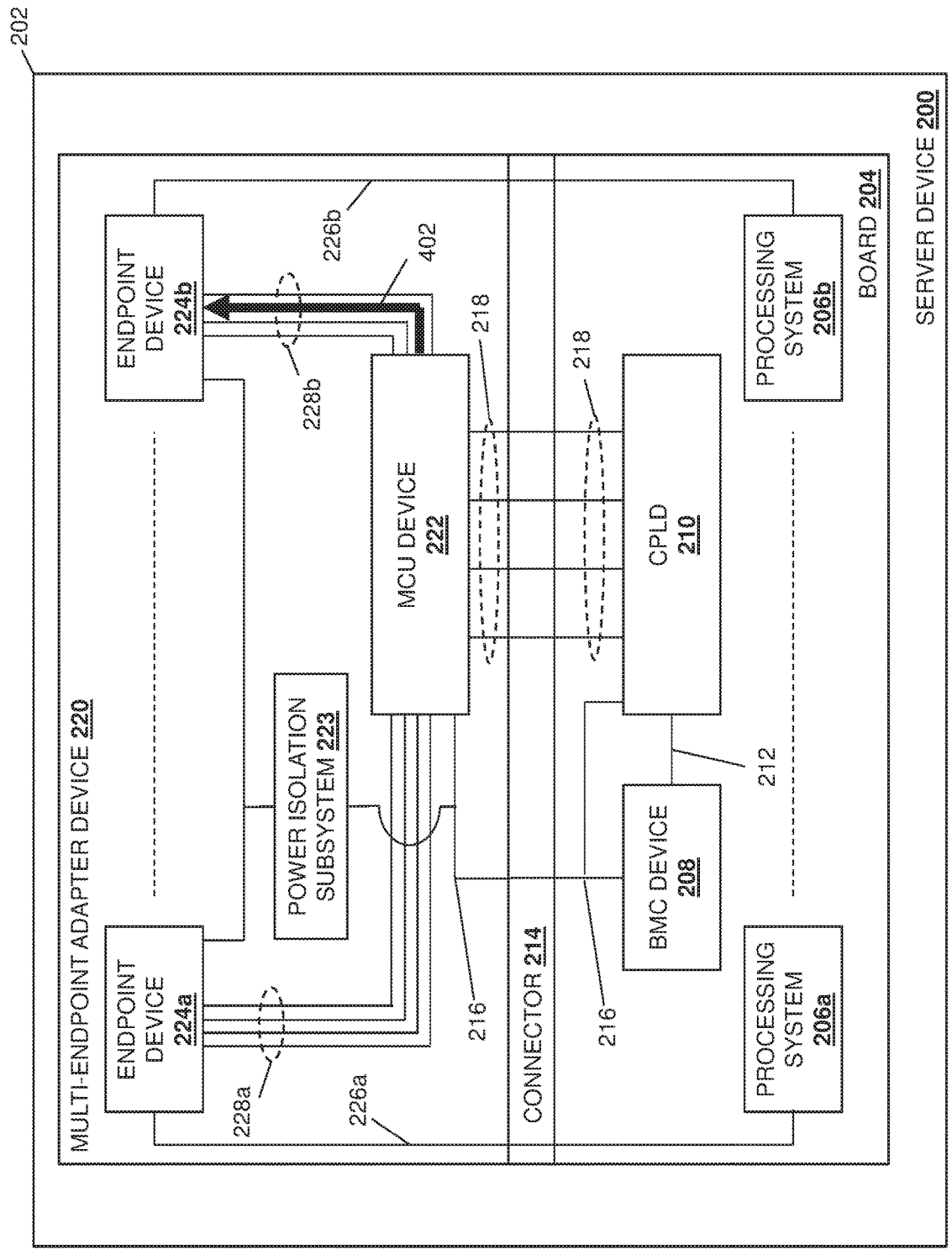
FIG. 4D is a schematic view illustrating an embodiment of the operation of the multi-endpoint device sideband communication system in the server device of FIG. 2 during the method of FIG. 3.

With reference to FIGS. 4A, 4B, and 4C, in response to receiving the reset signal 400 the MCU engine in the MCU device 222 may have retrieved a reset signal sideband communication policy that provides for the transmittal of that reset signal 400 to one of the endpoint devices, as well as for the transmittal of other reset signals received in other sideband communications from the CPLD 210. As such, the example in FIG. 4B illustrates the MCU engine in the MCU device 222 transmitting the reset signal 400 over the reset signal connection in the adapter sideband connection set 228a to the endpoint device 224a, which may be identified in the reset signal sideband communication policy. Furthermore, FIG. 4C illustrates the CPLD engine in the CPLD 210 transmitting a reset signal 402 over the sideband interface 216 to the MCU device 222. As will be appreciated by one of skill in the art in possession of the present disclosure, the sending of the reset signal 402 over the sideband interface 216 to the MCU device 222 is an example of the CPLD 210 performing multi-use hardware signal tunneling on the same bus that the BMC device 208 uses for endpoint device management, which may be performed using the MCTP Vendor Defined Message (VDM) over a PCIe bus. As illustrated in FIG. 4D, the MCU engine in the MCU device 222 may receive the reset signal 402 via the sideband interface 216 and, based on the reset signal sideband communication policy, may transmit that reset signal over the reset signal connection in the adapter sideband connection set 228b to the endpoint device 224b.

As will be appreciated by one of skill in the art in possession of the present disclosure, the sideband communications enabled by the reset signal sideband communication policy described above with reference to FIGS. 4A-4D may enable sequential reset operations for the endpoint devices (i.e., a first endpoint device may be sent a first reset signal transmitted by the CPLD 210 to the MCU device 222 via the adapter sideband connection set 218, a second endpoint device may be sent a second reset signal transmitted by the CPLD 210 to the MCU device 222 via the sideband interface 216, a third endpoint device may be sent a third reset signal transmitted by the CPLD 210 to the MCU device via the sideband interface 216 subsequent to transmittal of the second reset signal, and so on until a reset signal is transmitted to the last endpoint device.) In some examples, the reset signal sideband communication policy may identify to the MCU device 222 and/or the CPLD 210 that any discrete CPLD-to-MCU reset signal input will be transmitted to a first available endpoint devices, with the CPLD/sideband interface communications required to send reset signals to the other endpoints devices. As such, sequential 1-to-all sideband communications may be enabled by sideband communication policies programmed in the MCU device 222. Furthermore, one of skill in the art in possession of the present disclosure will recognize that the sideband communication policies may prevent the CPLD 210 from sending a reset signal to one or more of the endpoint devices 224a-224b such that 1-to-many sideband communications (i.e., more than two of the endpoint devices 224a-224b but less than all of the endpoint devices 224a-224b) may be enabled by sideband communication policies programmed in the MCU device 222.

Figure 5B:
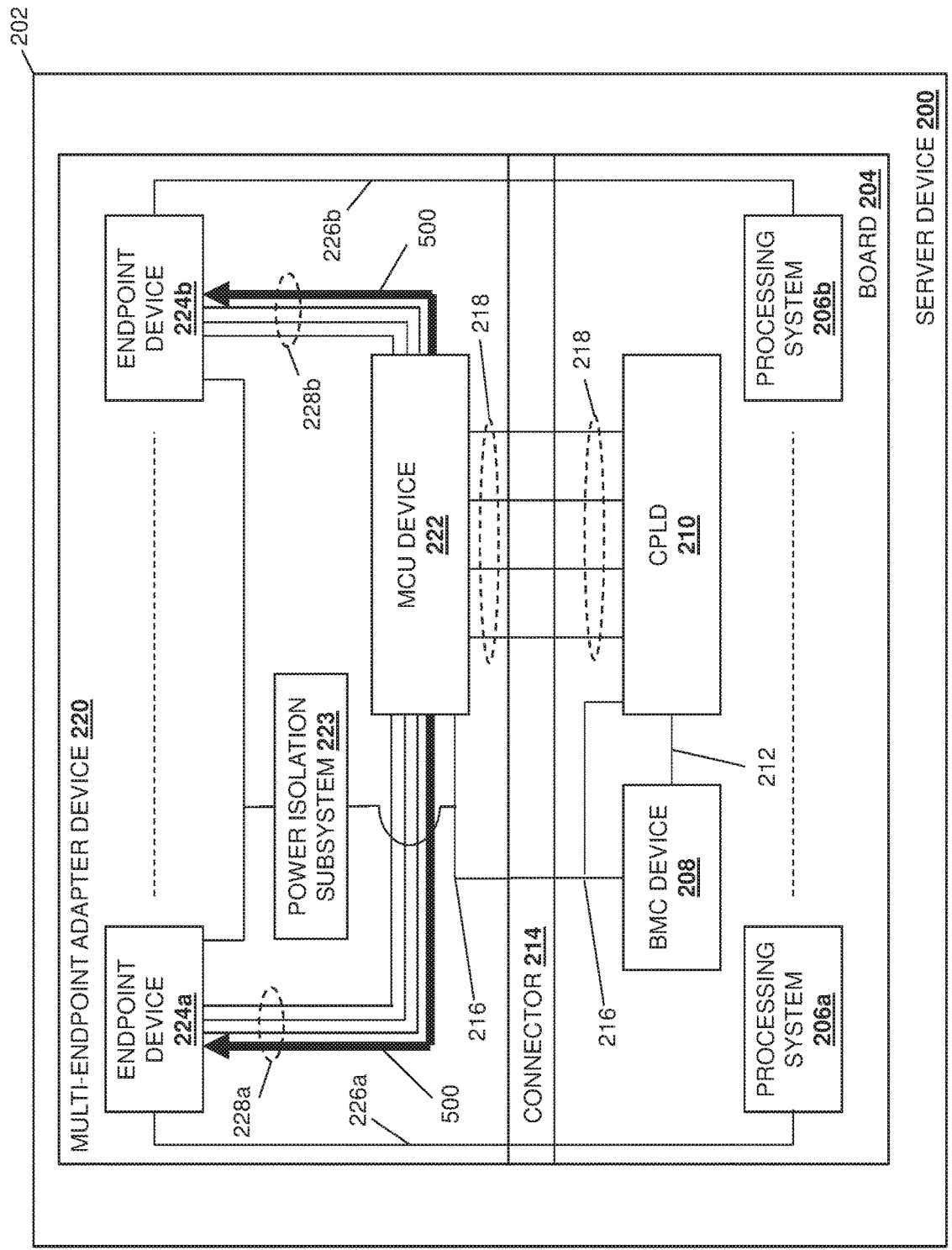
FIG. 5B is a schematic view illustrating an embodiment of the operation of the multi-endpoint device sideband communication system in the server device of FIG. 2 during the method of FIG. 3.

With reference to FIGS. 5A and 5B, in response to receiving the throttling signal 500 the MCU engine in the MCU device 222 may have retrieved a throttling signal sideband communication policy that provides for the transmittal of that throttling signal 400 to each of the endpoint devices 224a-224b. As such, the example in FIG. 5B illustrates the MCU engine in the MCU device 222 transmitting the throttling signal 500 over the reset signal connection in each of the adapter sideband connection sets 228a-228b to each of the endpoint devices 224a-224b, respectively. In some examples, the reset signal sideband communication policy may identify to the MCU device 222 and/or the CPLD 210 that any discrete CPLD-to-MCU reset signal input will be transmitted to all available endpoint devices. As such, 1-to-all parallel sideband communications may be enabled by sideband communication policies programmed in the MCU device 222.

Figure 6B:
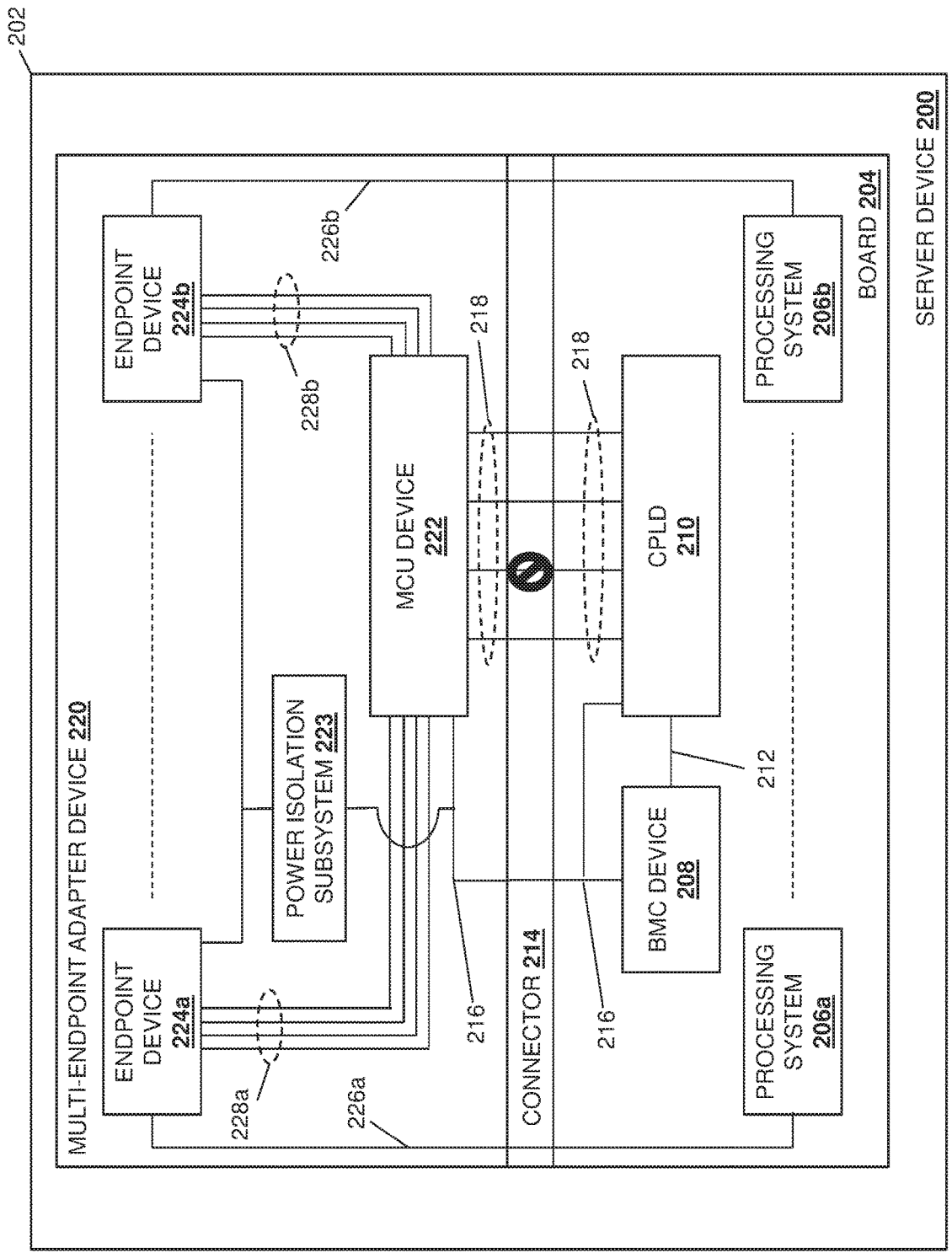
FIG. 6B is a schematic view illustrating an embodiment of the operation of the multi-endpoint device sideband communication system in the server device of FIG. 2 during the method of FIG. 3.

With reference to FIGS. 6A and 6B, in response to receiving the wake signal 600 the MCU engine in the MCU device 222 may have retrieved a wake signal sideband communication policy that provides for the blocking of that wake signal 600. As such, the example in FIG. 6B illustrates the MCU engine in the MCU device 222 blocking the transmittal of the wake signal 600 over the wake signal connection in the adapter sideband connection set 218. As such, sideband communication blocking may be enabled by sideband communication policies programmed in the MCU device 222. While several specific examples of sideband communications enabled by the programming of the MCU device 222 with sideband communication policies have been described, one of skill in the art in possession of the present disclosure will recognize that that sideband communication policies programmed in the MCU device 222 may provide the logging of any particular sideband communication sent to or from the endpoint devices 224a-224b based on endpoint device presence or wake status, the ignoring of any particular sideband communication sent to or from the endpoint devices 224a-224b based on endpoint device presence or wake status, the provisioning of different sideband communication behaviors for any particular sideband communication sent to or from the endpoint devices 224a-224b based on endpoint device presence or wake status, the pulsing of a reset signal sideband communication to an endpoint device to perform link recovery, the holding of a reset signal sideband communication to an endpoint device to disable that endpoint device, the masking of sideband communications to or from the endpoint devices 224a-224b, and/or virtually any sideband communication policy that would be apparent to one of skill in the art in possession of the present disclosure.

Thus, systems and methods have been described that provide sideband communications with multiple endpoints by providing respective sets of sideband links between an MCU device on a multi-endpoint adapter device and each of a plurality of PCIe endpoint devices on that multi-endpoint adapter device. Upon boot of a server device, a BMC device and/or CPLD on a board in the server device may provide sideband communication policies to the MCU device on the multi-endpoint adapter device that is connected to the board. The CPLD may then subsequently provide sideband communications via the single set of sideband links available to the MCU device, and upon receiving any sideband communication, the MCU device may retrieve the sideband communication policy for that sideband communication and handle that sideband communication according to the sideband communication policy. The handling of the sideband communication may include transmitting that sideband communication over any of the respective sets of sideband links to any of the PCIe endpoint devices connected thereto. As such, PCIe endpoint device sideband communication use cases such as 1-to-1 sideband communications, 1-to-many sideband communications, 1-to-all sideband communications, as well a variety of other sideband communication use cases discussed above are enabled with multiple PCIe endpoint devices connected to a board via a single PCIe connector. Furthermore, while discussed as applied to multiple PCIe endpoints on a multi-endpoint adapter device, one of skill in the art in possession of the present disclosure will recognize that the teachings provided herein may provide for sideband communication to multiple subsystems of any type via a single sideband communication interface while remaining within the scope of the present disclosure as well.

Furthermore, the present disclosure is being filed along with U.S. patent application Ser. No. 16/396,022, filed on Apr. 26, 2019, and directed to virtual machine deployment techniques; U.S. patent application Ser. No. 16/396,200, filed on Apr. 26, 2019, and directed to data splitting techniques; U.S. patent application Ser. No. 16/396,320, filed on Apr. 26, 2019, and directed to data duplicating techniques; U.S. patent application Ser. No. 16/396,453, filed on Apr. 26, 2019, and directed to packet routing techniques; U.S. patent application Ser. No. 16/395,468, filed on Apr. 26, 2019, and directed to communication coupling configuration techniques; and U.S. patent application Ser. No. 16/396,521, filed on Apr. 26, 2019, and directed to connection configuration techniques; each of which include embodiments that utilize the multi-processor/multi-endpoint systems described in some of the embodiments included in the present disclosure. One of skill in the art in possession of the present disclosure will recognize how embodiments of the present disclosure may be combined with some or all of the disclosures discussed above, and thus those disclosures are incorporated by reference herein in their entirety.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-endpoint device sideband communication system, comprising:
    a board including:
      a multi-endpoint adapter device connector; and
      a board sideband communication subsystem that is connected to the multi-endpoint adapter device connector via a set of board sideband connections; and
    a multi-endpoint adapter device that is connected to the multi-endpoint adapter device connector, wherein the multi-endpoint adapter device includes:
      a plurality of endpoint devices; and
      an adapter sideband communication subsystem that is connected to the multi-endpoint adapter device connector via a first set of adapter sideband connections, and that is connected to each of the plurality of endpoint devices via respective second sets of adapter sideband communication connections, wherein the adapter sideband communication subsystem is configured to:
        receive a first sideband communication from the board sideband communication subsystem via the set of board sideband connections, the multi-endpoint adapter device connector, and the first set of adapter sideband connections;
        access a first sideband communication policy included in the adapter sideband communication subsystem; and
        provide, based on the first sideband communication policy, the first sideband communication to at least one of the plurality of endpoint devices via each respective second set of adapter sideband communication connections connected to that endpoint device, wherein the providing the first sideband communication to the at least one of the plurality of endpoint devices includes at least one action selected from the group of:
providing the first sideband communication to one of the plurality of endpoint devices;
providing the first sideband communication to all of the plurality of endpoint devices; and
providing the first sideband communication to more than two but less than all of the plurality of endpoint devices.

2. The system of claim 1, wherein the adapter sideband communication subsystem is configured to:
receive the first sideband communication policy from the board sideband communication subsystem; and
store the first sideband communication policy.

3. The system of claim 1, wherein the set of board sideband connections and each of the respective second sets of adapter sideband communication connections each include:
a present signal connection, a wake signal connection, a reset signal connection, and a throttling signal connection.

4. The system of claim 1, wherein the adapter sideband communication subsystem is configured to:
receive a second sideband communication from the board sideband communication subsystem via the set of board sideband connections, the multi-endpoint adapter device connector, and the first set of adapter sideband connections;
access a second sideband communication policy included in the adapter sideband communication subsystem; and
provide, based on the second sideband communication policy, the second sideband communication to at least one of the plurality of endpoint devices that did not receive the first sideband communication and via each respective second set of adapter sideband communication connections connected to that endpoint device.

5. The system of claim 1, wherein the adapter sideband communication subsystem is configured to:
receive a second sideband communication from of one of the plurality of endpoint devices via the respective second set of adapter sideband communication connections connected to that endpoint device;
access a second sideband communication policy included in the adapter sideband communication subsystem; and
block, based on the second sideband communication policy, the second sideband communication from being provided to the board sideband communication subsystem via the first set of adapter sideband connections, the multi-endpoint adapter device connector, and the set of board sideband connections.

6. An Information Handling System (IHS), comprising:
a first set of adapter sideband connections that are configured to connect to a board sideband communication subsystem;
respective second sets of adapter sideband communication connections that are each configured to connect to a respective endpoint device;
an adapter sideband communication processing system coupled to the first set of adapter sideband connections and each respective second set of adapter sideband connections; and
an adapter sideband communication memory system that is coupled to the adapter sideband communication processing system and that includes instructions that, when executed by the adapter sideband communication processing system, cause the adapter sideband communication processing system to provide an adapter sideband communication engine that is configured to:
receive, via the first set of adapter sideband connections, a first sideband communication from the board sideband communication subsystem;
access a first sideband communication policy included in the adapter sideband communication memory system;
provide, based on the first sideband communication policy, the first sideband communication to at least one of a plurality of endpoint devices via the respective second set of adapter sideband communication connections connected to that endpoint device;
receive, via the first set of adapter sideband connections, a second sideband communication from the board sideband communication subsystem;
access a second sideband communication policy included in the adapter sideband communication memory system; and
provide, based on the second sideband communication policy, the second sideband communication to at least one of a plurality of endpoint devices that did not receive the first sideband communication via the respective second set of adapter sideband communication connectors connected to that endpoint device.

7. The IHS of claim 6, wherein the adapter sideband communication engine is configured to:
receive the first sideband communication policy from the board sideband communication subsystem; and
store the first sideband communication policy.

8. The IHS of claim 6, wherein each of the respective second sets of adapter sideband communication connections each include:
a present signal connection, a wake signal connection, a reset signal connection, and a throttling signal connection.

9. The IHS of claim 6, wherein the providing the first sideband communication to the at least one of the plurality of endpoint devices includes at least one action selected form the group of:
providing the first sideband communication to one of the plurality of endpoint devices;
providing the first sideband communication to all of the plurality of endpoint devices; and
providing the first sideband communication to more than two but less than all of the plurality of endpoint devices.

10. The IHS of claim 6, wherein the adapter sideband communication engine is configured to:
receive a second sideband communication from of one of the plurality of endpoint devices via the respective second set of adapter sideband communication connections connected to that endpoint device;
access a second sideband communication policy included in the adapter sideband communication memory system; and
block, based on the second sideband communication policy, the second sideband communication from being provided to the board sideband communication subsystem via the first set of adapter sideband connections and a connector.

11. The IHS of claim 6, wherein the first set of adapter sideband connections are coupled to a connector that is configured to connect to a board that includes the board sideband communication subsystem.

12. A method for providing sideband communications with multiple endpoints, comprising:

receiving, by an adapter sideband communication subsystem via a first set of adapter sideband connections, a first sideband communication from a board sideband communication subsystem;

accessing, by the adapter sideband communication subsystem, a first sideband communication policy included in the adapter sideband communication subsystem;

providing, by the adapter sideband communication subsystem via at least one of a plurality of respective second sets of adapter sideband connections and based on the first sideband communication policy, the first sideband communication to at least one of a plurality of endpoint devices via the respective second set of adapter sideband communication connections connected to that endpoint device;

receiving, by the adapter sideband communication subsystem, a second sideband communication from one of the plurality of endpoint devices via the respective second set of adapter sideband communication connections connected to that endpoint device;

accessing, by the adapter sideband communication subsystem, a second sideband communication policy included in the adapter sideband communication subsystem; and blocking, by the adapter sideband communication subsystem based on the second sideband communication policy, the second sideband communication from being provided to the board sideband communication subsystem via the first set of adapter sideband connections and a connector that is connected to a board that includes the board sideband communication subsystem.

13. The method of claim 12, further comprising:

receiving, by the adapter sideband communication subsystem, the first sideband communication policy from the board sideband communication subsystem; and storing, by the adapter sideband communication subsystem, the first sideband communication policy.

14. The method of claim 12, wherein each of the respective second sets of adapter sideband communication connections each include:

a present signal connection, a wake signal connection, a reset signal connection, and a throttling signal connection.

15. The method of claim 12, wherein the providing the first sideband communication to the at least one of the plurality of endpoint devices includes at least one action selected form the group of:

providing the first sideband communication to one of the plurality of endpoint devices;

providing the first sideband communication to all of the plurality of endpoint devices; and providing the first sideband communication to more than two but less than all of the plurality of endpoint devices.

16. The method of claim 12, further comprising:

receiving, by the adapter sideband communication subsystem via the first set of adapter sideband connections, a second sideband communication from the board sideband communication subsystem;

accessing, by the adapter sideband communication subsystem, a second sideband communication policy included in the adapter sideband communication subsystem; and providing, by the adapter sideband communication subsystem based on the second sideband communication policy, the second sideband communication to at least one of the plurality of endpoint devices that did not receive the first sideband communication and via the respective second set of adapter sideband communication connections connected to that endpoint device.

17. The method of claim 12, wherein the first set of adapter sideband connections are coupled to the connector.

* * * * *